US008332916B2

(12) United States Patent
Isobe et al.

(10) Patent No.: US 8,332,916 B2
(45) Date of Patent: Dec. 11, 2012

(54) USER IDENTIFICATION SYSTEM AND A METHOD THEREOF

(75) Inventors: Yoshiaki Isobe, Yokohama (JP); Takao Murakami, Yokohama (JP); Kenta Takahashi, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 960 days.

(21) Appl. No.: 12/379,639

(22) Filed: Feb. 26, 2009

(65) Prior Publication Data

US 2010/0011423 A1 Jan. 14, 2010

(30) Foreign Application Priority Data

Jul. 11, 2008 (JP) .................................. 2008-180885

(51) Int. Cl.
*G06F 7/04* (2006.01)
(52) U.S. Cl. ........................................................... 726/5
(58) Field of Classification Search ........................ 726/5
See application file for complete search history.

(56) References Cited

U.S. PATENT DOCUMENTS 7,464,256 B2 * 12/2008 Muir ................................... 713/1
7,545,962 B2 * 6/2009 Peirce et al. .................. 382/115

2004/0164848 A1 8/2004 Hwang et al.
2007/0150745 A1 6/2007 Peirce et al.
2008/0178262 A1 * 7/2008 Taniguchi et al. ................ 726/2

FOREIGN PATENT DOCUMENTS

| CN | 1655501 | 8/2005 |
| JP | 2002-351843 | 12/2002 |

* cited by examiner

*Primary Examiner* — Kambiz Zand
*Assistant Examiner* — Abiy Getachew
(74) *Attorney, Agent, or Firm* — Antonelli, Terry, Stout & Kraus, LLP.

(57) ABSTRACT

A service providing system using the biometrics identification without inputting the user ID poses the problem that the consideration of a service is erroneously claimed to the registered user not using the service due to the erroneous identification. According to this invention, the threshold of the value of the degree of similarity for user identification is set strictly for each registered biometrics information of the user in accordance with the declaration of the loss caused by the erroneous identification.

7 Claims, 12 Drawing Sheets

| ITEM NUMBER | ITEM | DESCRIPTION |
|---|---|---|
| 501 | USER IDENTIFICATION NUMBER | NUMBER FOR SYSTEM TO UNIQUELY IDENTIFY USER |
| 502 | USER NAME | NAME OF USER |
| 503 | USER PLACE OF CONTACT | USER PLACE OF CONTACT<br>•POSTAL SERVICE ADDRESS<br>•E-MAIL ADDRESS<br>•IMMEDIATE E-MAIL ADDRESS |
| 504 | USER SETTLEMENT INFORMATION | CREDIT NUMBER, ETC. |
| 511 | REGISTRATION DATE | REGISTERED DATA/HOUR |
| 512 | PERSONAL CONFIRMATION DOCUMENT | DOCUMENT SUCH AS DRIVER'S LICENSE OR PASSPORT USED FOR PERSONAL IDENTIFICATION |
| 513 | STATE | STATE OF SETTLEMENT |

FIG. 6

| ITEM NUMBER | ITEM | DESCRIPTION |
| --- | --- | --- |
| 601 | BIOMETRICS INFORMATION IDENTIFICATION NUMBER | NUMBER FOR SYSTEM TO UNIQUELY IDENTIFY REGISTERED BIOMETRICS INFORMATION |
| 602 | USER IDENTIFICATION NUMBER | NUMBER FOR SYSTEM TO UNIQUELY IDENTIFY USER (LINKED TO 501) |
| 603 | USER BIOMETRICS INFORMATION | REGISTERED INFORMATION FOR IDENTIFICATION |
| 604 | REGISTRATION DATE | REGISTERED DATE/HOUR |
| 611 | QUALITY | INFORMATION ON QUALITY OF REGISTERED DATA |
| 612 | THRESHOLD VALUE | THRESHOLD VALUE FOR EACH TEMPLATE |
| | | |

FIG. 7

| ITEM NUMBER | ITEM | DESCRIPTION |
|---|---|---|
| 701 | COLLATION LOG IDENTIFICATION NUMBER | NUMBER FOR SYSTEM TO UNIQUELY IDENTIFY COLLATION LOG INFORMATION |
| 702 | USER BIOMETRICS INFORMATION | COLLATION BIOMETRICS INFORMATION INPUT FOR IDENTIFICATION |
| 703 | IDENTIFICATION NUMBER OF IDENTIFIED BIOMETRICS INFORMATION | IDENTIFICATION NUMBER OF IDENTIFIED REGISTERED BIOMETRICS INFORMATION |
| 711 | SETTLEMENT TERMINAL IDENTIFICATION NUMBER | NUMBER FOR UNIQUELY IDENTIFYING SETTLEMENT TERMINAL REQUESTING SETTLEMENT (OR INFORMATION ASSOCIATED WITH SHOP INFORMATION THEREOF) |
| 712 | INPUT DATE/HOUR | BIOMETRICS SETTLEMENT INPUT REQUEST DATE/HOUR |
| 713 | SETTLEMENT INFORMATION | SETTLEMENT IDENTIFICATION INFORMATION IN UNITS OF SETTLEMENT (OR INFORMATION ASSOCIATED WITH SETTLEMENT INFORMATION) |
| | | |
| | | |

USER IDENTIFICATION SYSTEM AND A METHOD THEREOF

This application claims priority based on a Japanese patent application, No. 2008-180885 filed on Jul. 11, 2008, the entire contents of which are incorporated herein by reference.

BACKGROUND

This invention relates to a system and a method for providing a service using the result of identifying a user by measuring the physical and behavioral features of the user.

The conventional techniques of a system for identifying a user by measuring the features of the user include JP-A-2002-351843 (hereinafter referred to as Document 1). Document 1 relates to the construction of a user authentication system using the biometrics information and contains the description about the storage and operation of a template. According to Document 1, in order to reduce the operation cost for storing the template, etc., the template generated based on the biometrics information input from the user is synthesized with the template stored in advance to re-register a template. More specifically, a part of the template of the biometrics information is held at the time of registration, and at the time of re-registration, the particular part of the template is synthesized with the biometrics information input at the time of re-registration thereby to generate "a complete" template. This configuration holds only a part of the biometrics information in the system and can improve the security while at the same time reducing the psychological resistance (against the storage of the private information) of the user.

SUMMARY OF THE INVENTION

Document 1, however, fails to take into consideration the expected error of the user identification from the viewpoint of the accuracy of operation in the biometrics authentication (collation) system. Especially, the loss which may be suffered by the user at the time of occurrence of an identification error of the user is not described at all, thereby posing the problem in the service and operation of the identification system.

Accordingly, the invention provides a system and a method which can suppress the occurrence of an erroneous identification with respect to the loss declaration from the user due to the erroneous identification.

According to the invention, there are provided a system and a method capable of correcting an erroneous identification and collation.

According to the disclosed system, a threshold value of a value relating to the degree of similarity for user identification is held for each registered information (for example, template or registered biometrics information) of the user and adapted to be changed for each registered information of the user. In the case where an erroneous identification of the user is declared by the user, the threshold value is reset more strictly, i.e. toward a more difficult level to meet for each registered information of the user.

Preferably, the input information (for example, the biometrics information for collation) which has caused the erroneous identification is recorded in a watch list (hereinafter sometimes referred to as the WL), and at the time of reuse by the user, the WL is identified thereby to properly correct the loss event caused by the erroneous identification.

Preferably, in the case where an erroneous identification is declared, the re-identification process is executed for all the registered information other than that of the declarer thereby to properly correct the loss event of the erroneous identification for the identified user.

According to the disclosed system, the threshold value of the degree of similarity for identification of the legitimate user is held and adapted to be changed for each registered information of the user. In the case where an erroneous identification is declared, therefore, the threshold value for each registered information of the user can be reset more strictly with the result that the loss event due to the erroneous identification can be corrected without leaving it as a risk, thereby reducing the risk in the service operation of the identification system.

These and other benefits are described throughout the present specification. A further understanding of the nature and advantages of the invention may be realized by reference to the remaining portions of the specification and the attached drawings.

DETAILED DESCRIPTION OF THE EMBODIMENTS

Figure 9:
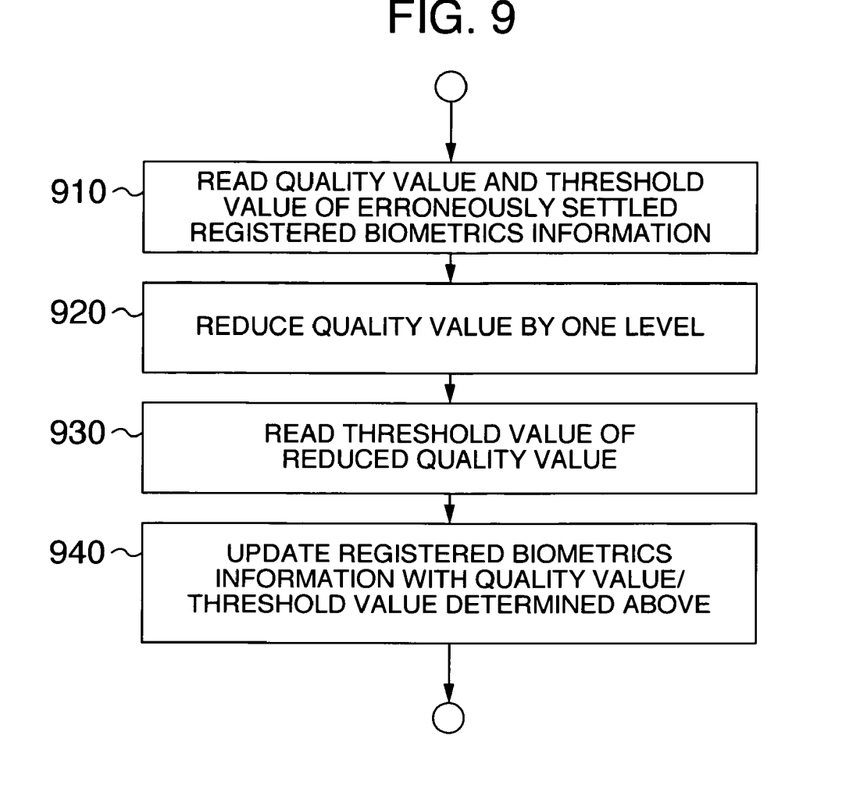
FIG. 9 is a flowchart illustrating a first protective process against the erroneous settlement according to an embodiment of the invention.
Figure 12:
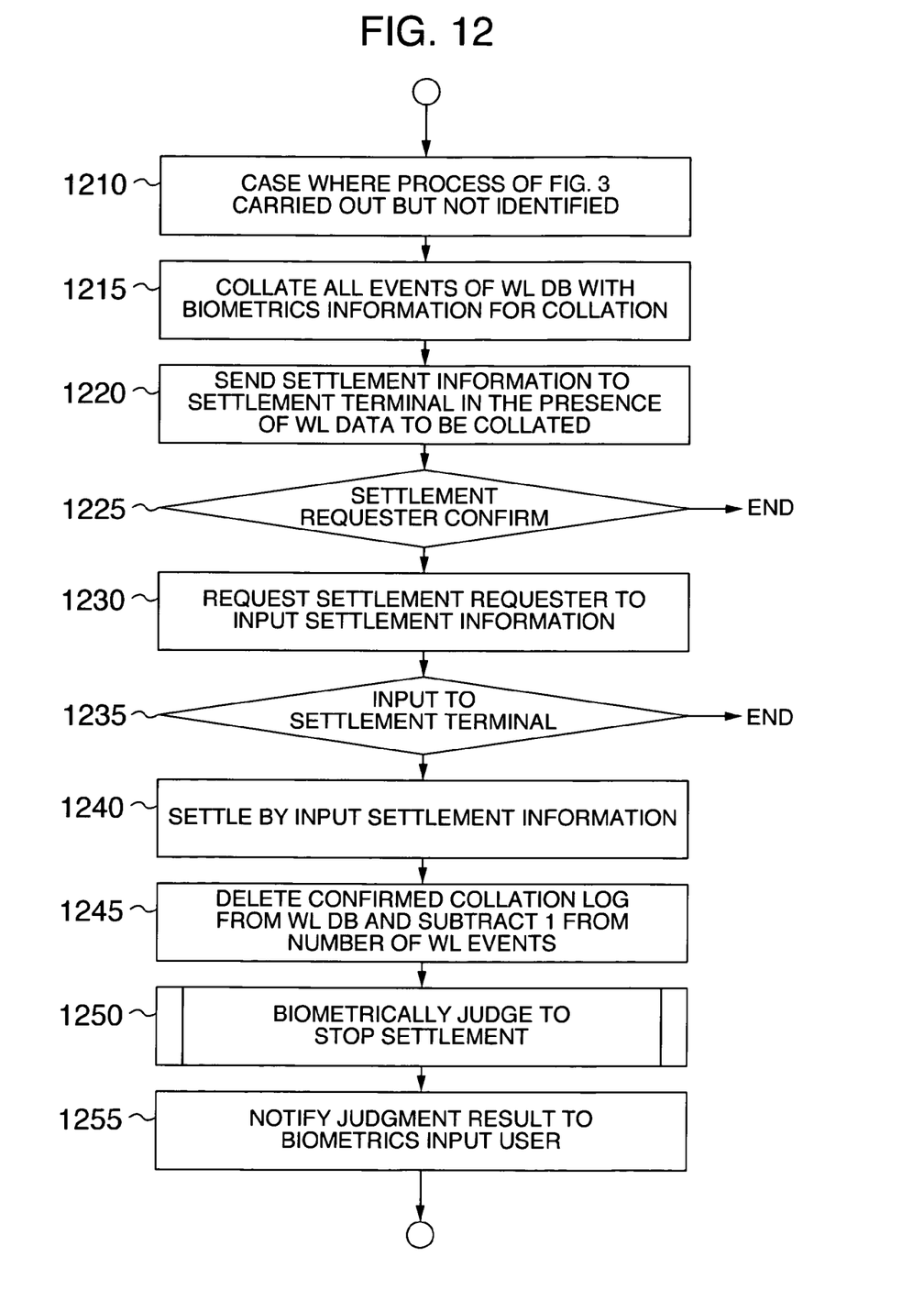
FIG. 12 is a flowchart illustrating the correction process and the process of countermeasure in the case where the user cannot be identified in normal operation using the watch list data as the second process of countermeasure against the erroneous settlement according to an embodiment of the invention.
Figure 13:
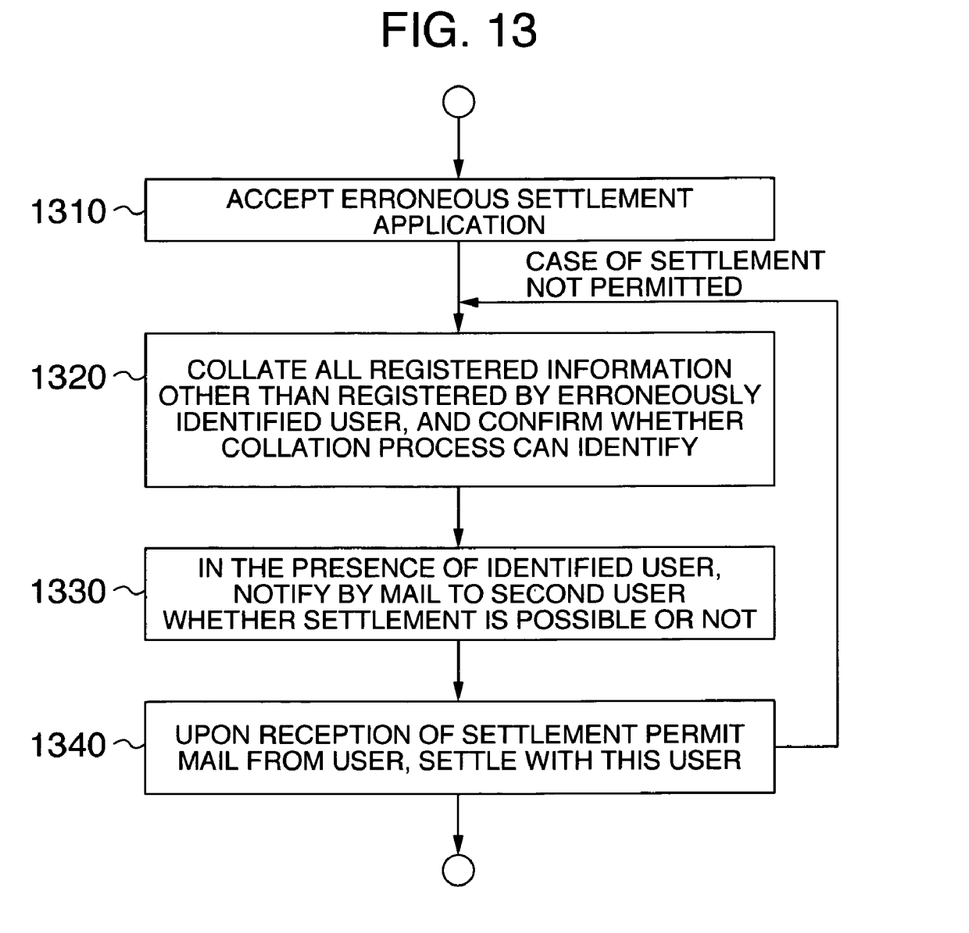
FIG. 13 is a flowchart illustrating a third process of countermeasure against the erroneous settlement according to an embodiment of the invention.

This invention includes a means in which, in the case where the user declares the loss due to the erroneous identification, the threshold value of the degree of similarity for user identification can be set more strictly for each registered biometrics information of the user (FIG. 9). Further, the invention includes a mean in which the collated biometrics information that has caused the erroneous identification is recorded in a watch list (FIG. 10), and at the time of reuse by the user, the WL is identified thereby to properly correct the loss event of the erroneous identification (FIGS. 11 and 12). Further, the invention includes a means in which at the time of the loss declaration due to the erroneous identification, the re-identification process is executed for all the registered biometrics information other than the registered biometrics information of the declarer thereby to properly correct the loss event due to the erroneous identification for the identified user (FIG. 13).

An embodiment of the invention is explained with reference to the drawings. An embodiment of the invention represents, as an example, a service for settling the account in accordance with the card number of the user identified biometrically. Nevertheless, the invention is not limited to the example but also applicable to, for example, a room entry/exit management server. Also, the invention is applicable to the authentication service using only the biometrics information of the user without the card.

Figure 1:
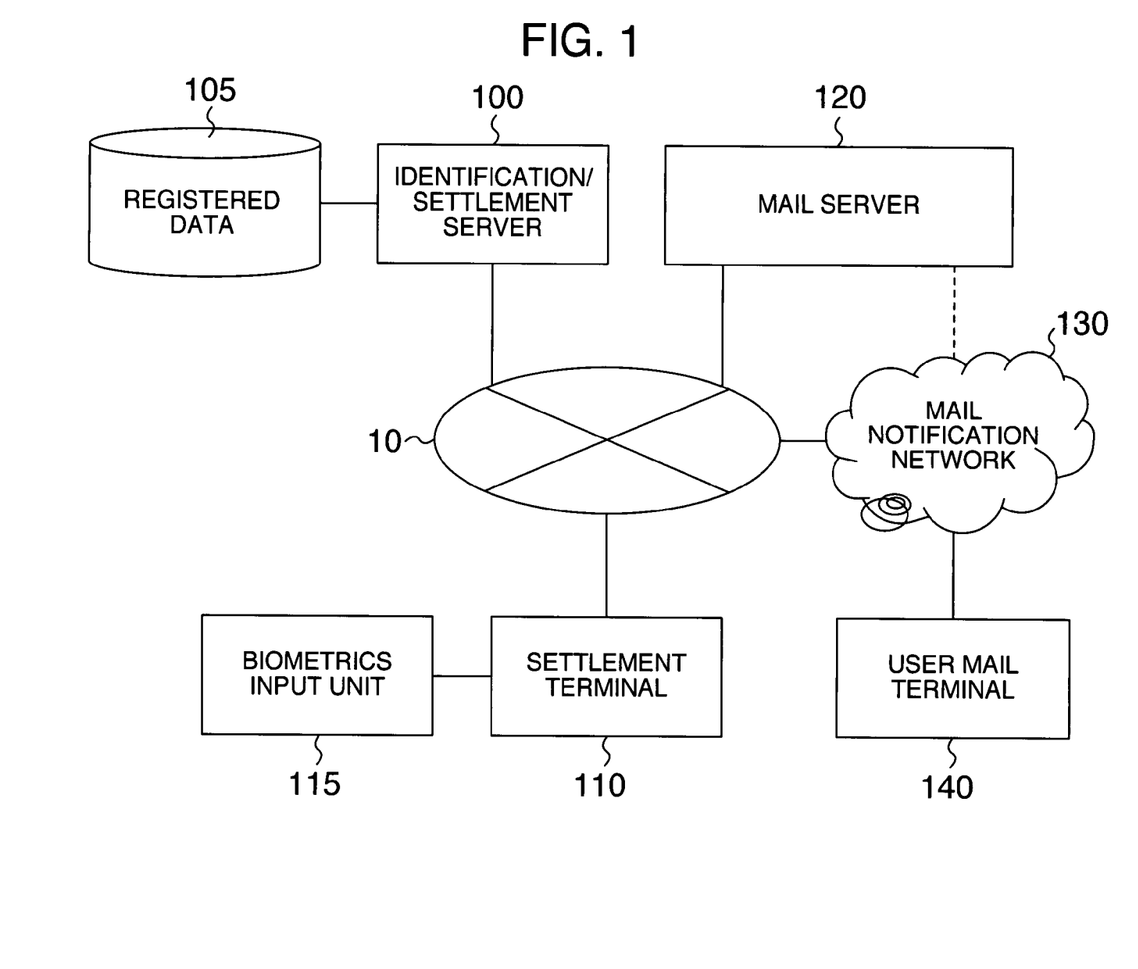
FIG. 1 is a diagram illustrating the system configuration according to an embodiment of the invention.

First, the system configuration according to this embodiment is shown in FIG. 1. The units (computers) are coupled to each other through a network. Also, each computer includes a storage unit having a memory or a hard disk and a processing unit such as a CPU, and the processing unit processes the information in accordance with the program stored in the storage unit. As shown in FIG. 1, this embodiment includes an identification/settlement server 100 for providing the identification/settlement service through a network 10 using the data registered based on the service application submitted by the user in advance, a settlement terminal 110 having plural biometrics input units (reader/writers) 115 coupled to the network 10 to use the identification/settlement service, and an e-mail server 120 for notifying the content of the settlement to the e-mail destination registered beforehand in the user with whom the account has been settled in accordance with the identified result of this identification/settlement service. The identification/settlement server 100 is coupled to the storage unit storing the registered data 105. The identification function and the settlement function of the identification/settlement server 100 may be separated into different servers. The e-mail server 120 can notify the user mail terminal 140 through an e-mail notification network 130.

Figure 2:
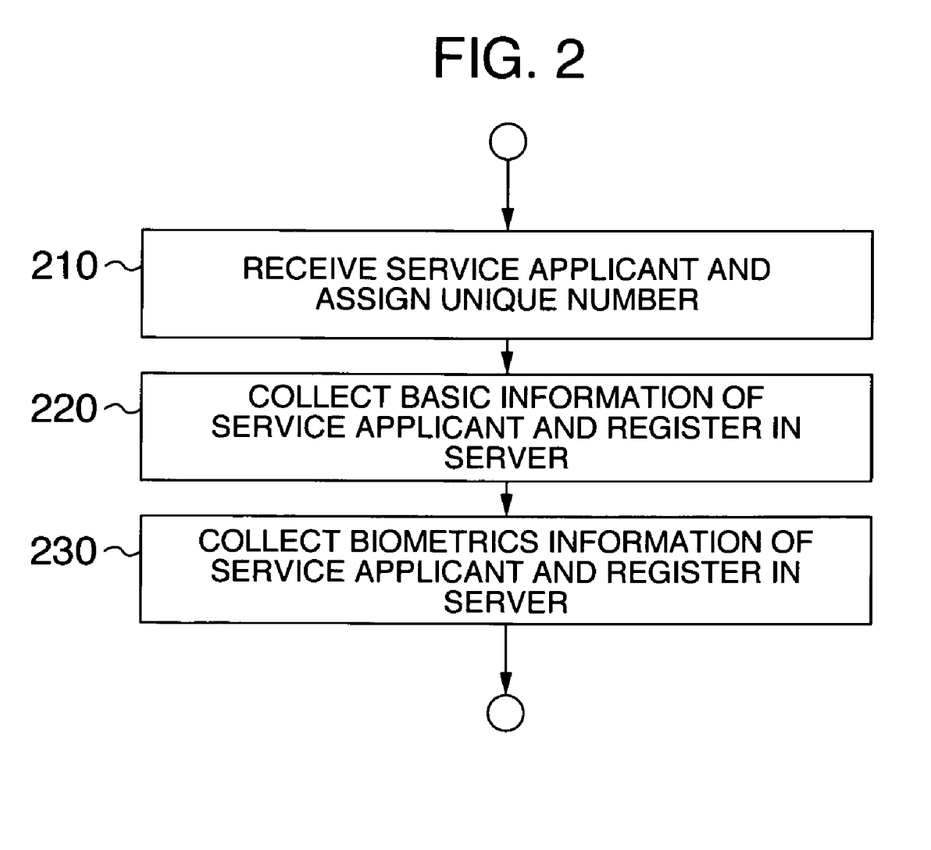
FIG. 2 is a flowchart illustrating the registration process according to an embodiment of the invention.

The flow of the steps for registering the user in advance is shown in FIG. 2 as a prerequisite of this embodiment. In step 210, the identification/settlement server 100 receives the basic information of the service applicant from the settlement terminal 110, the user e-mail terminal 140 or the user terminal (home PC, etc.), and assigns a unique new number (the user identification number shown in FIG. 5). In step 220, the identification/settlement server 100 collects the basic information of the service applicant by association with the unique number and registers it as the basic information (FIG. 5) in the registered data 105. In step 230, the identification/settlement server 100 collects the biometrics information (registered biometrics information) of the service applicant from the settlement terminal 110, the user e-mail terminal 140 or the user terminal (home PC, etc.) by association with the unique number and registers it as the biometrics registration information (see FIG. 6) in the registered data 105.

Figure 3:
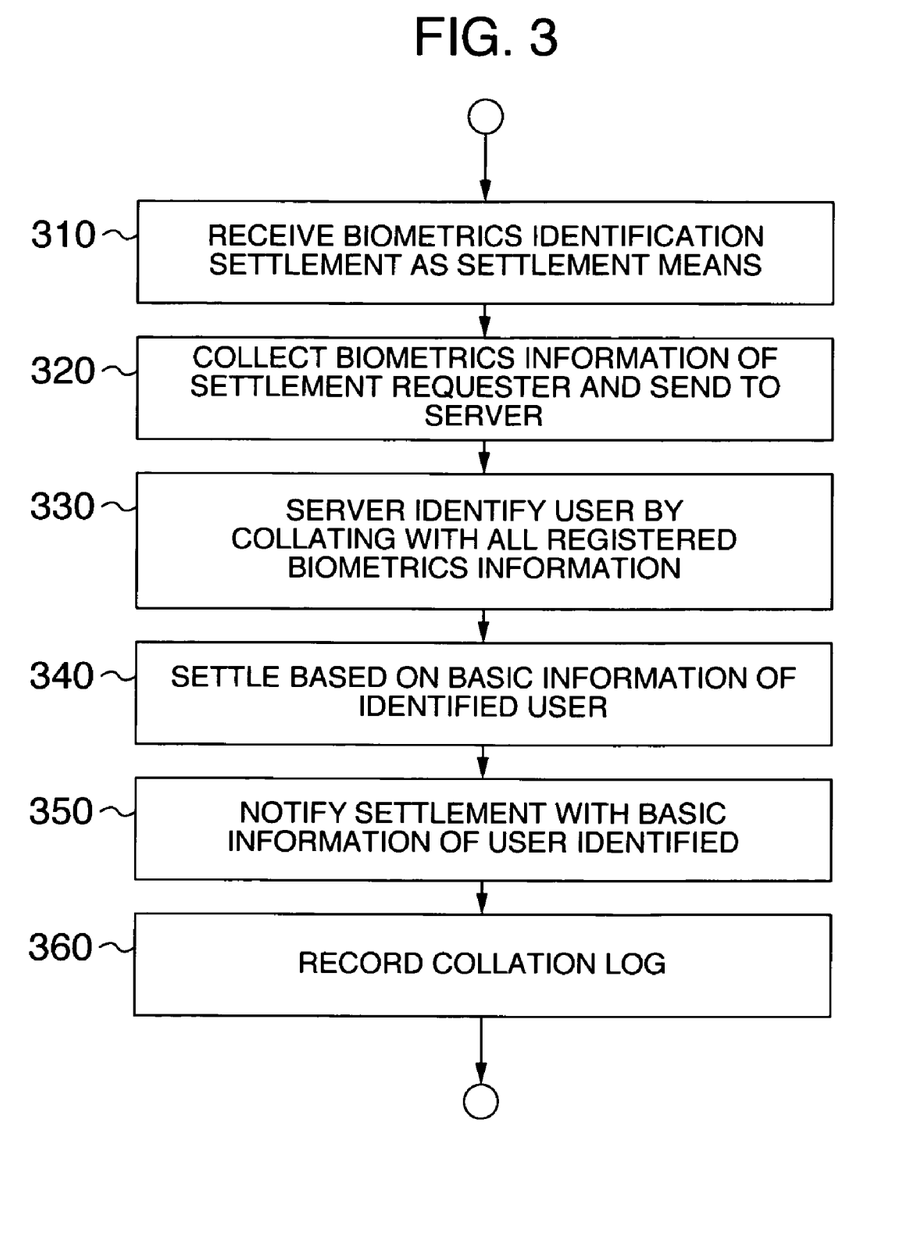
FIG. 3 is a flowchart illustrating the collation/settlement process at the time of normal operation of registration according to an embodiment of the invention.

The flow of the identification/settlement process is shown in FIG. 3 as a prerequisite to the embodiment. In step 310, the settlement terminal 110 receives the biometric identification and settlement selected as a settlement means from the settlement requester. In step 320, the settlement terminal 110 samples the biometrics information of the settlement requester for collation from the biometrics input units 115, and sends it to the identification/settlement server 100 together with the settlement information (name of settlement requester, settlement amount, settlement means, name of the other party of settlement). In step 330, the identification/settlement server 100 collates all the biometrics information stored in the registered data 105 with the biometrics information for collation obtained in step 320 thereby to identify the user. In the case where the degree of similarity between the registered biometrics information and the biometrics information for collation is larger than a threshold value (in the case where distance is smaller than the threshold value), for example, the collation is judged as a success, and otherwise (the distance is larger than the threshold value), judged as a failure. The user is identified by the basic information of the service applicant that is associated with the registered biometrics information which is judged as a successful collation. In step 340, the identification/settlement server 100 settles the account based on the basic information of the user identified in step 330. In step 350, the identification/settlement server 100, with reference to the basic information (e-mail address) of the identified user, notifies the contents of the settlement added with a unique identification number as the settlement event to the user through the e-mail server 120. An example of the contents of the notification is the settlement information that the account is settled. In step 360, the identification/settlement server 100 records in the registered data 105, as the collation log information, the information on the settlement event added with the identification number of step 350 in such a manner as to be accessible with the identification number of step 350 (see FIG. 7).

Figure 4:
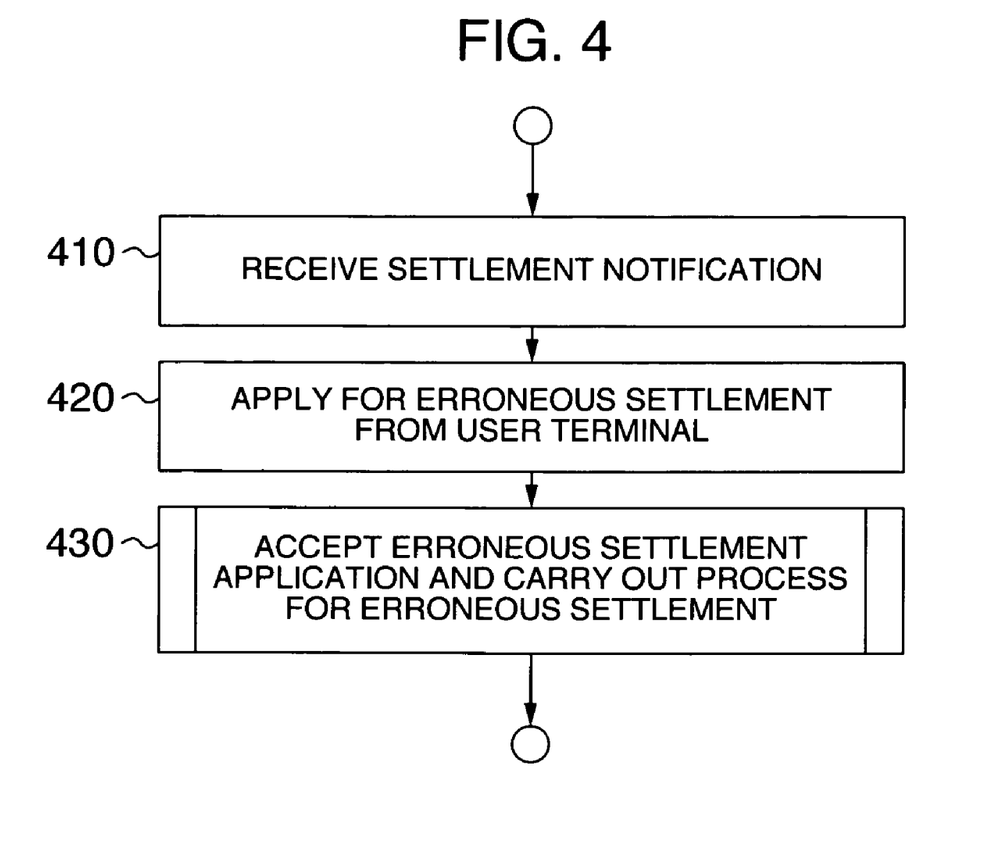
FIG. 4 is a flowchart illustrating the general process for erroneous settlement according to an embodiment of the invention.

Now, the process of accepting the occurrence of the erroneous settlement according to an embodiment of the invention is shown in FIG. 4. In step 410, the user e-mail terminal 140 receives the settlement event notification of step 350 through the e-mail system 120. In step 420, if the settlement does not mean anything to the user, the user e-mail terminal 140, at the request of the user, accesses the Web page of the identification/settlement server 100 and declares that the proposed settlement with the settlement event identification number described in the settlement event notification is erroneous. In step 420, if the settlement means something to the user, on the other hand, the user e-mail terminal 140 ends the process without declaring that the proposed settlement is erroneous. In step 430, the identification/settlement server 100 accepts the erroneous settlement event from the user e-mail terminal 140 and executes the process against the erroneous identification as a feature of the invention.

Figure 5:
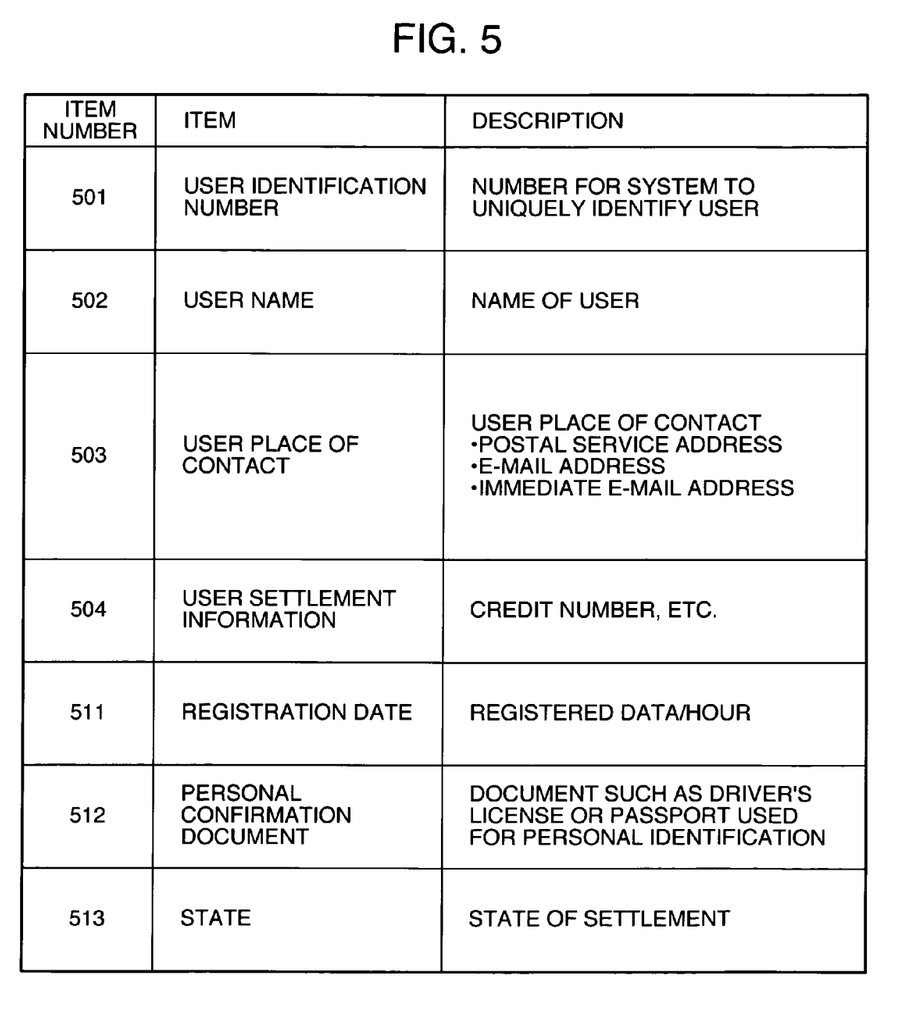
FIG. 5 is a list illustrating the contents of the basic information for user registration according to an embodiment of the invention.

Now, an example of the basic information for registration according to an embodiment is shown in FIG. 5. The user identification number 501 is recorded by the system as the number for uniquely identifying and managing the user. The user name 502 is the name of the user recorded. The user place of contact 503 is recorded as the place where the user can be contacted. Specifically, the place of contact such as the postal mail address or the e-mail address or the immediate notification e-mail address (portable phone, etc.) is registered. The user settlement information 504 is recorded as the credit number of the user. The registration date/hour 511 is recorded as the date/hour when the particular registration information is registered. The personal identification document 512 is recorded as the type of the certificate identifying the user at the time of registration of the basic information. Driving license or passport is an example. In such cases, the identification number of the certificate may be also recorded. The state 513 is recorded as the state of settlement by the user identified on the system in step 501. For example, the usability, the prohibited use or the time limit is recorded as the state.

Figure 6:
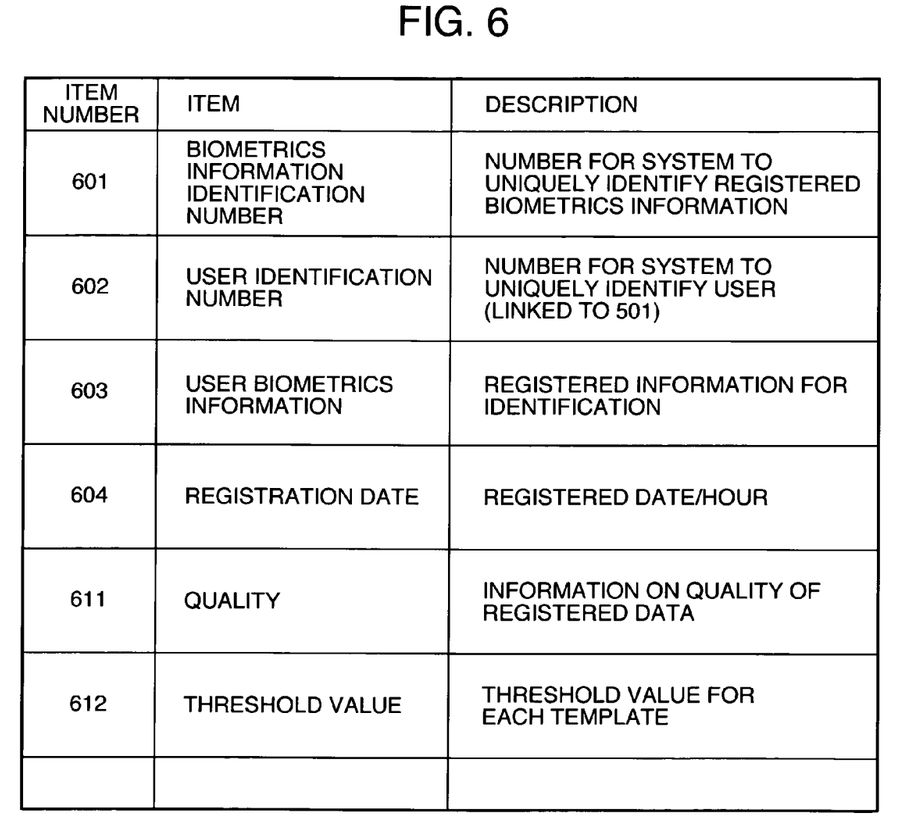
FIG. 6 is a list illustrating the contents of the biometrics information for user registration according to an embodiment of the invention.

Now, an example of the biometrics registered information according to an embodiment is shown in FIG. 6. The biometrics information identification number 601 is recorded as the number allowing the system to uniquely identify the registered biometrics information. Plural types of biometrics information may be registered for the user. The user identification number 602 is recorded as the number allowing the system to uniquely identify and manage the user. This number corresponds to the user identification number 501 of the basic user information and is the same number for the same user. The user biometrics information 603 is a template of the user biometrics information recorded as the registered information for biometrics identification. Examples are the image information such as the vein, the fingerprint and the iris. The registered date 604 is recorded as the date/hour when the user biometrics information is registered in the system. In some cases, only the biometrics information is re-registered and not always identical with the basic information 511. The personal identification document 605 is recorded as the type of the certificate confirming the personal identification at the time of registration of the biometrics information. Driving license or passport is an example. In some cases, the identification number of the certificate is also recorded. The quality 611 is recorded as the information on the quality of the registered biometrics information 603. The quality of the registered biometrics information 603 may be input and set by the manager. The threshold value 612 is recorded and set for the registered biometrics information 603. The initial value may be input and set by the manager, and subsequently can be updated by the identification/settlement server 100 in accordance with the erroneous identification.

The initial values of the quality 611 and threshold value 612 may be set in the manner described in (1) to (3) below. (1) At the time of registration, the initial values are set as a common threshold according to the policy of the system operation. (2) At the time of registration, the data quality of the registered biometrics information is evaluated, and the initial values are set as threshold values corresponding to this quality value. (3) At the time of registration, the registered biometrics information is identified and collated with all the biometrics information already registered, and the quality is evaluated based on the maximum degree of similarity (or the distance) between the biometrics information already registered and the identified performance, so that the threshold value is set in accordance with to quality value.

Figure 7:
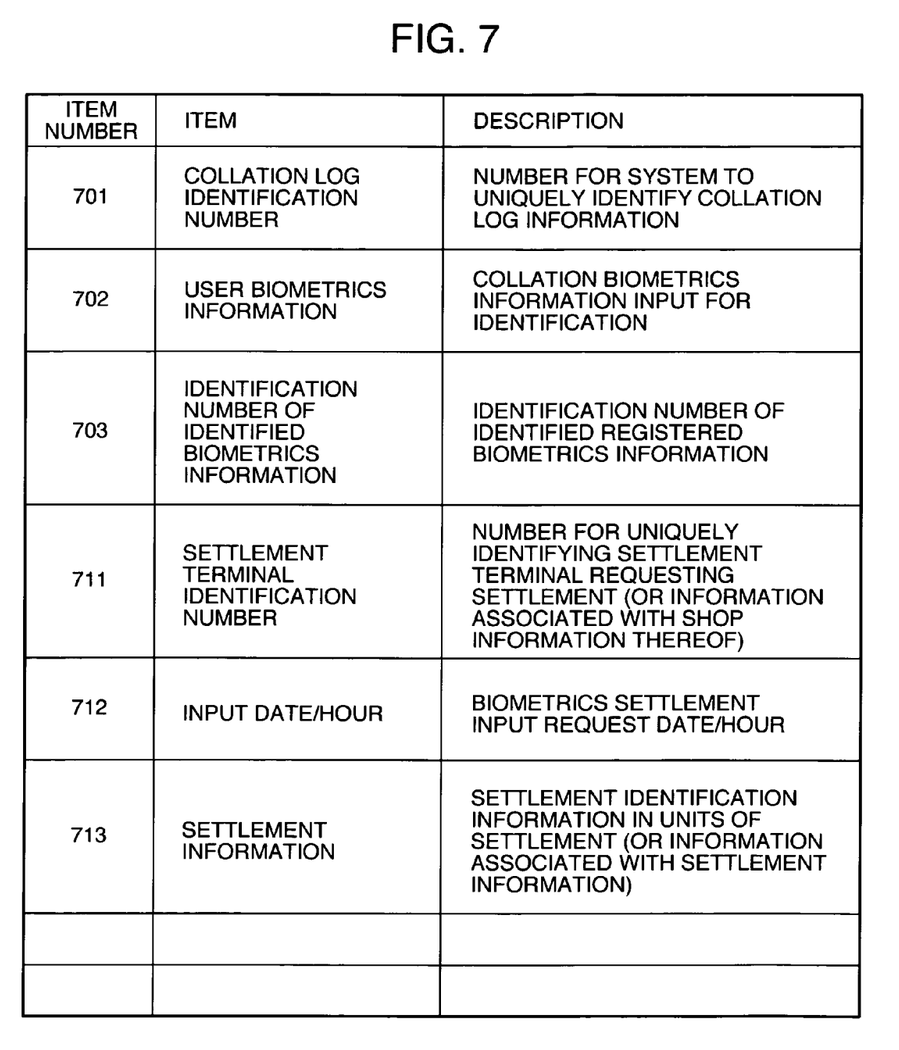
FIG. 7 is a list illustrating the contents of the settlement event collation log information according to an embodiment of the invention.

An example of the settlement event log information designated by 360 according to this embodiment is shown in FIG. 7. The settlement event log identification number 701 is stored to allow the system to uniquely identify the settlement event. The settlement requester biometrics information 702 is stored as the biometrics information for collation inputted by the settlement requester for identification. The identification number 703 of the identified biometrics information is stored as the identification number of the registered biometric information that has been identified. The settlement terminal identification information 711 is stored as the number (or the information associated with the shop information) for uniquely identifying the settlement terminal at which the settlement has been requested. The input date/hour 712 is stored as the date/hour when the biometrics information is input by the settlement requester. The settlement information 713 is stored as the settlement identification information (or the information based on the settlement information) in units of settlement.

The identification number 703 may be held not as one piece of identification information used for settlement but as a list of one or plural identification information, as the registered biometrics information exceeding the threshold value, in descending order of degree of similarity.

Figure 8:
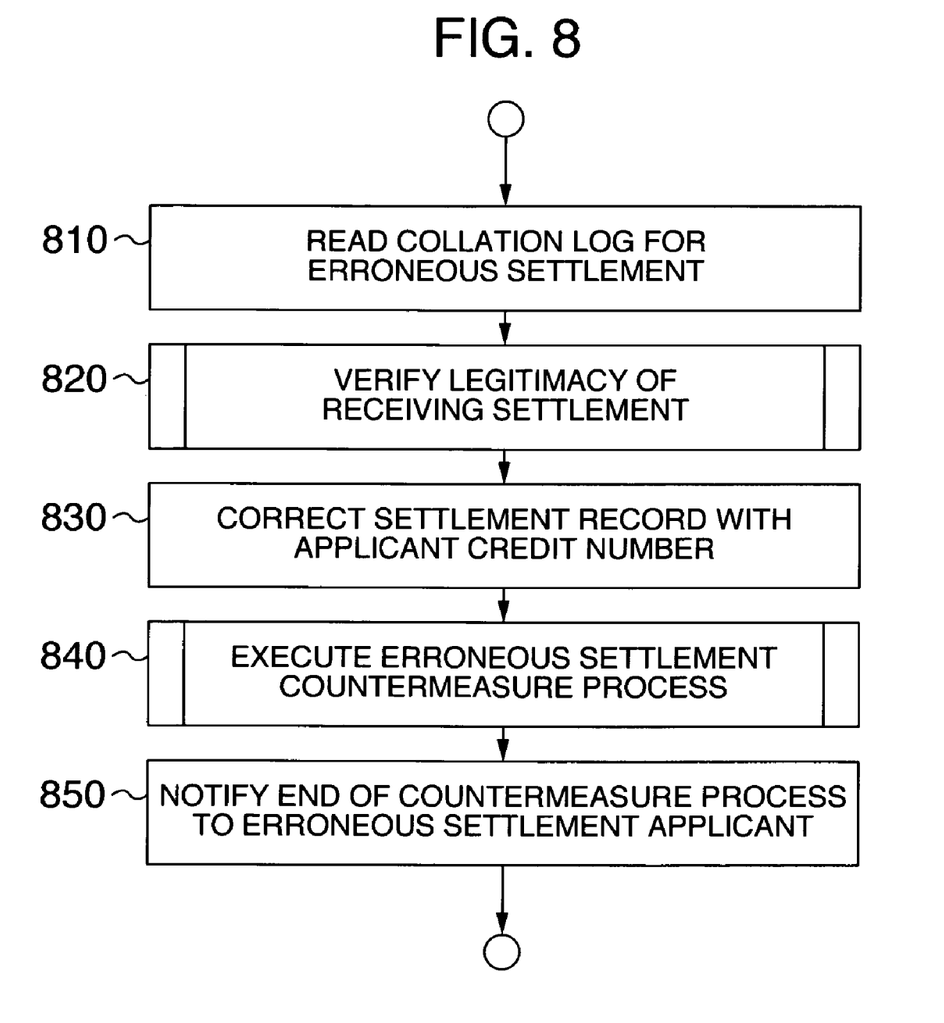
FIG. 8 is a flowchart illustrating the process for the erroneous settlement according to an embodiment of the invention.

An example of the flow of the process 430 against the erroneous settlement according to an embodiment shown in FIG. 4 is explained with reference to FIG. 8. In step S810, the identification/settlement server 100 reads, from the registered data 105, the collation log of the settlement event having the collation log identification number 701 corresponding to the settlement event identification number designated in step 420. In step 820, the identification/settlement server 100 verifies whether the acceptance of the application from the applicant as erroneous settlement is legitimate or not. This legitimacy verification is judged, for example, by the method described below.

(1) The judgment is made by predetermining a threshold value of the collation score up to which a given settlement can be regarded as an erroneous settlement.

(2) The judgment is made by confirming the crime-prevention (surveillance) camera installed at the terminal which has developed an erroneous settlement.

(3) The judgment is made by examining the alibi of the applicant for the erroneous settlement.

(4) The usability of the terminal at which the erroneous settlement has occurred is judged by confirming the service history of the applicant for the erroneous settlement. For example, the use, if any, at a place so distant to reach in time from the terminal at which the erroneous settlement has occurred leads to the judgment as legitimate.

In step 830, the identification/settlement server 100 deletes the corresponding settlement event items from the settlement record of the applicant. In step 840, the identification/settlement server 100 executes a process of countermeasure against the erroneous identification (erroneous settlement) (described in detail later). In step 850, the identification/settlement server 100 notifies the end of the process of countermeasure and the effect thereof to the applicant for the erroneous settlement. The destination of the notification to the applicant for the erroneous settlement can be identified from the address of the sender of the application for the erroneous settlement in step 430.

A first process of countermeasure against the erroneous identification according to the embodiment is shown in FIG. 9. In step 910, the identification/settlement server 100 reads, from the registered data 105, the information (quality value, threshold value) representing the registered biometrics information having the biometrics information identification number (604) corresponding to the identification number (703) of the registered biometrics information associated with the erroneous identification described in the settlement event collation log that has been read in step 810. In step 920, the identification/settlement server 100 reduces the level of the quality value (611) accessed in step 910 by a predetermined amount (for example, one level). The quality value of level 10, for example, is reduced to level 9. Incidentally, the predetermined value may not be a fixed value but may be increased with the number of errors committed. In step 930, the identification/settlement server 100 determines a threshold value coincident with the quality value of the level set in step 920. In step 940, the identification/settlement server 100 updates the record of the identification number of the registered biometrics information in accordance with the quality value and the threshold value determined in steps 920 and 930.

In the threshold value determination process of step 930 described above, a table setting the threshold value for each level of the quality value is prepared and the threshold value is determined by reference to this table. This table is preferably stored in the storage unit accessible by the identification/settlement server 100. The threshold value is preferably set in such a manner that the lower the quality value level, the higher the threshold level, i.e. the more strict to succeed in the authentication.

Figure 10:
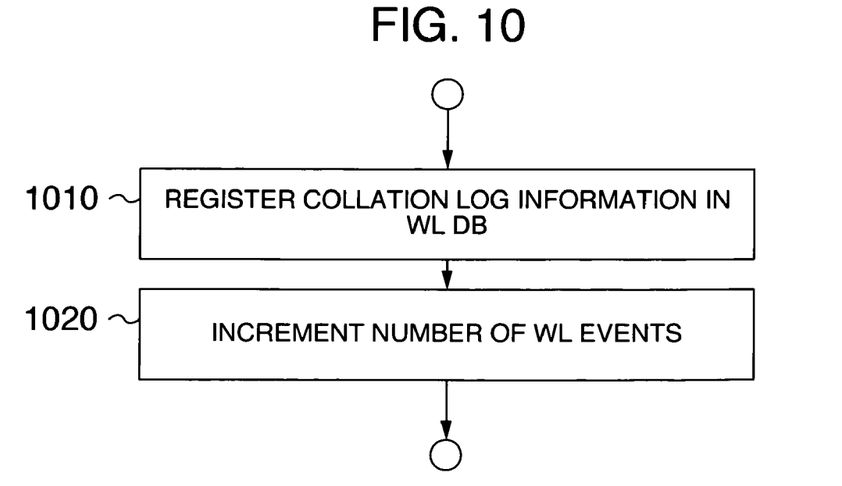
FIG. 10 is a flowchart illustrating the additional registration process of a watch list as a second process of countermeasure against the erroneous settlement according to an embodiment of the invention.
Figure 11:
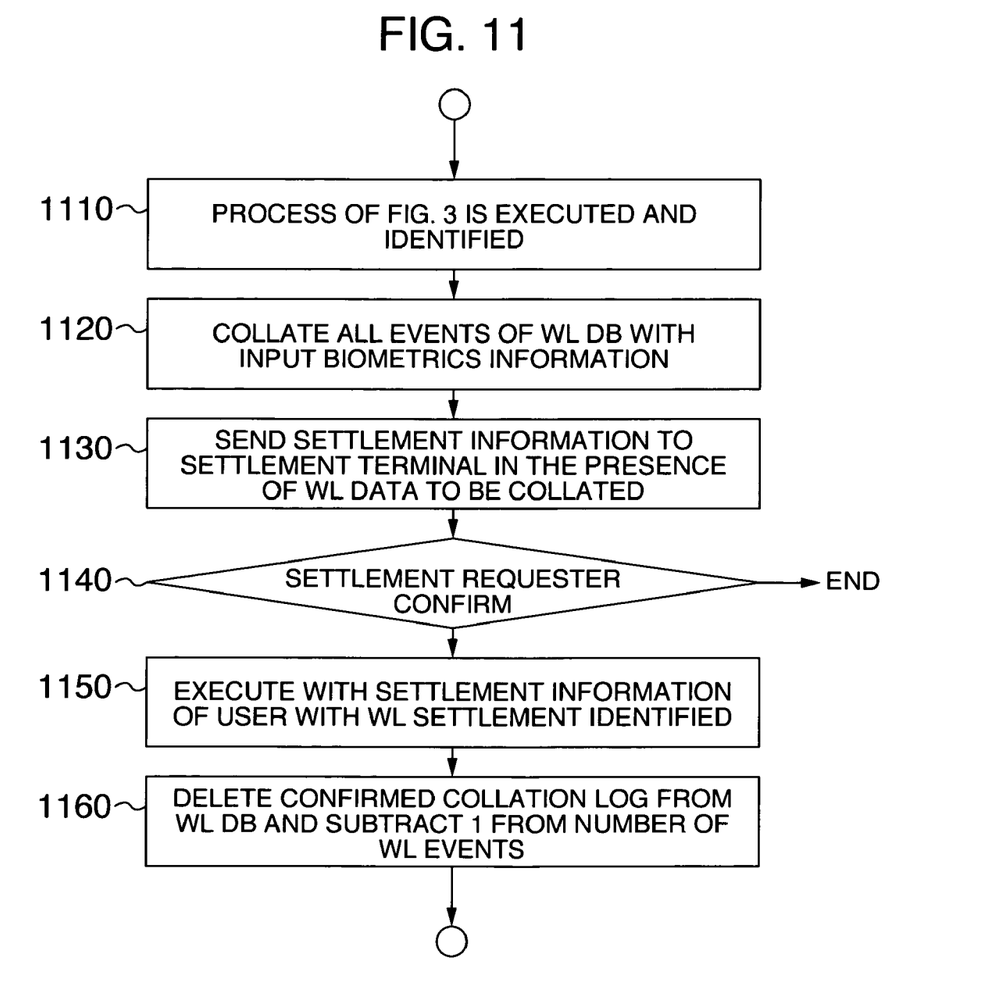
FIG. 11 is a flowchart illustrating the correction process in the case where the user can be identified in normal operation using the watch list data as the second process of countermeasure against the erroneous settlement according to an embodiment of the invention.

A second protective process against the erroneous identification according to this embodiment is shown in FIGS. 10, 11 and 13. First, the process additionally registered in the watch list for the settlement event of the erroneous identification is shown in FIG. 10. In step 1010, the identification/settlement server 100 additionally registers the collation log information (FIG. 7) of the settlement event read in step 810 in the watch list (WL) data base (registered data 105). The identification/settlement server 100 may register the whole collation log information (FIG. 7) or only the collation log identification information (701) of the collation log information (FIG. 7) in the watch list. In step 1020, the identification/settlement server 100 increments (adds 1) the number of events in the watch list stored as the registered data 105.

The process of correcting the erroneous identification using the watch list is further explained with reference to FIGS. 11 and 12. This process is executed additionally in the case where the number of WL events is 1 or more in the normal operation shown in FIG. 3. It is assumed that the threshold change shown in FIG. 9 makes more difficult the identification (collation) using the registered biometrics information causing the erroneous identification, and in the subsequent identification operation, the correct user is considered more liable to be identified. A case in which the identification is successful through the process (step 330) shown in FIG. 3 is shown in FIG. 11.

Assuming that the user is identified in the normal operation shown in FIG. 3, the identification/settlement server 100 executes step 1110 to judge whether the number of WL events is 1 or more by reference to the number of WL events in the registered data 105 and execute the subsequent process in the case where the number of WL events is 1 or more. In the case where the number of WL events is not more than 1 (in the case where it is 0), on the other hand, the process is ended. In step 1120, the identification/settlement server 100 identifies by collating all the biometrics information for collation in the WL data base with the biometrics information for collation inputted for the settlement request as collected in step 320. In the case where the degree of similarity between the registered biometrics information and the biometrics information for collation is larger than a threshold value (in the case where the distance is smaller than the threshold value), the collation is judged as a success. Otherwise (in the case where the distance is larger than the threshold), the collation is judged as a failure. The user is identified by the basic information of the service applicant associated with the registered biometrics information with the collation judged as a success. In step 1130, if WL includes the biometrics information identified in step S1120, the identification/settlement server 100, notifies the WL settlement information, through the e-mail server 120, to the settlement terminal 140 of the user identified in step 330. The identification/settlement server 100, in the absence of the identified biometrics information in step S1120, may suspend the settlement process without notification. In step S1140, the identification/settlement server 100 proceeds to step 1150 in the case where the user who has received the notification in step 1130 confirms the contents of the settlement and the identification/settlement server 100 receives the response indicating the confirmation from the user e-mail terminal 140. In the case where the response indicating the confirmation is not received, on the other hand, the process is ended. In step 1150, the identification/settlement server 100 executes the settlement process in accordance with the settlement information of the user of which the WL settlement is identified in step 1120. In step 1160, the identification/settlement server 100 deletes the WL settlement event identified in step 1120 from the WL and increments the number of WL events (subtracts 1).

A case in which the identification has failed in the process of FIG. 3 is shown in FIG. 12. Although the threshold change of FIG. 9 makes difficult the identification of the erroneously registered biometrics information, the situation may be the same also for identification of the biometrics information correctly used or no one may be able to identify it. In such a case, the registered biometrics information of the correct user is required to be registered again.

In step 1210, the identification/settlement server 100, in the case where the user identification fails in the normal operation process of FIG. 3, refers to the number of WL events in the registered data 105 and judging whether the number of WL events is 1 or more, carries out the subsequent process if the number is one or more. In the case where the number of WL events is not 1 or more (in the case where it is 0), on the other hand, the process is ended. In step 1215, the identification/settlement server 100 identifies by collating all the biometrics information for collation in the WL data base with the biometrics information for collation collected in step 320 and inputted for settlement request. In step 1220, in the presence of the identified biometrics information in the WL in step 1215, the identification/settlement server 100 sends the WL settlement information to the settlement terminal. The identification/settlement server 100 may suspend the settlement process without notification in the case where the identified biometrics information is not existent in the WL in step 1215. In step 1225, the identification/settlement server 100 prompts the user having requested the settlement in normal operation to confirm the settlement contents based on the settlement information displayed at the settlement terminal. In the process, if the confirmation of the displayed settlement information can be obtained from the settlement requester, the process proceeds to step 1230. In the case where no confirmation is obtained, on the other hand, the process is ended. In step 1230, the identification/settlement server 100 requests the settlement requester to input the settlement information. In step 1235, the identification/settlement server 100 proceeds to step 1240 in the case where the settlement information (credit card) is presented and inputted by the settlement requester. In the case where the input cannot be obtained, on the other hand, the process proceeds to step 1240. In step 1240, the identification/settlement server 100 executes the settlement process based on the input settlement information. In step 1245, the identification/settlement server 100 deletes the WL settlement event identified in step 1120 from the WL and decrements the number of WL events (subtracts 1). In step 1250, the identification/settlement server 100, if the user name of the input settlement information is retrieved from the basic information of the user, can judge that the account cannot be settled by the registered information based on the biometrics information, and therefore, changes the state 513 in the basic information to suspend the biometrics information identification/settlement service. In step 1255, the identification/settlement server 100 notifies this state change to the user from the settlement terminal and, if the service is continued, prompts the re-registration.

The flowchart of a third process of countermeasure executed at the time of receiving the erroneous settlement application according to this embodiment is shown in FIG. 13. In step 1310, the identification/settlement server 100 accepts the erroneous settlement application, and like in step 810, reads the collation log of the settlement event. In step 1320, the identification/settlement server 100 executes the identification by collation again for all the registered information other than that of the applicant user and confirms whether the identification is possible or not. In the case where the identification is impossible, the process is ended. In step 1330, in the presence of the user identified in step 1320, the identification/settlement server 100 notifies by e-mail to the user. In the absence of the user identified in step 1320, on the other hand, the process is ended without notification. In step 1340, the identification/settlement server 100, if the use of the settlement service is confirmed from the notified user, executes the settlement process for the particular user. In the case where no confirmation is obtained, on the other hand, the process returns to step 1320, and the identification process is repeated for those users other than the user who has applied for the erroneous settlement and the user identified previously in the present processing flow. Incidentally, the identification/settlement server 100 may judge that the confirmation cannot be obtained in the case where the use of the settlement service cannot be confirmed upon lapse of a predetermined time (one day, one week) from the notification, or in the case where the response to the notification is received to the effect that no settlement service is used.

In the case where all the identification numbers of the registered biometrics information exceeding the threshold value are recorded in the settlement event collation log, the identification process of step 1320 is not executed and the corresponding users may be notified in the descending order of the degree of similarity (ascending order of distance).

This invention is used for a system to identify or authenticate the user only with the input of the biometrics information without the ID card or the cash card.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. A user identification system including:
a settlement terminal which accepts a settlement request from a service user; and
an identification/settlement server which identifies the service user using biometric information of the service user and executes a settlement process according to the received settlement request,
wherein the settlement terminal includes means for obtaining the biometric information of the service user in response to acceptance of the settlement request,
wherein the identification/settlement server includes:
a storage unit storing therein (1) basic information including a notification address, registered biometric information, a biometric information identification number for identifying the registered biometric information, and a criteria relating to similarity, for each of a plurality of service applicants, and (2) log information in which a record of a service usage event used by a service applicant, a log identification number of the service usage event, and the biometric information identification number of the registered biometric information used for identifying the service usage event, are associated with each other;
a means for calculating the similarity by collating the registered biometric information with the obtained biometric information and determining whether the storage unit stores therein the registered biometric information, the similarity of which with the obtained biometric information, satisfies the criteria;
a means for notifying, if the storage unit stores the registered biometric information, the similarity of which with the obtained biometric information satisfies the criteria, the notification address associated with the registered biometric information of the service usage event and the log identification number of the service usage event by referring to the storage unit;
a means for storing the log information in which the notified log identification number and the biometric information identification number of the registered biometric information which satisfies the criteria are associated with each other; and
a means for identifying, when receiving the log identification number as an erroneous identification from the service applicant which receives the notification, the biometric information identification number of the service usage event corresponding to the erroneous identification from the log identification number, and resetting the criteria associated with the registered biometric information identified by the biometric information identification number of the erroneous identification more strictly.

2. The user identification system according to claim 1, wherein collation log information corresponding to the service usage event confirmed as the erroneous identification is registered as a watch list.

3. The user identification system according to claim 2, comprising:
a means for identifying the information newly input by the user, in the case where at least one piece of collation log information recording the service usage event confirmed as the erroneous identification is registered as a watch list and the user can be authenticated by comparing the newly input information with a plurality pieces of registered biometric information stored in a storage unit, by comparing the information newly input by the user with the registered biometric information stored in the watch list; and
a means for distributing, in the case where the newly input information is specified, the consideration of the service of the watch list to the authenticated user.

4. The user identification system according to claim 2, comprising:
a means for identifying the information newly input by the user, in the case where at least one piece of the collation log information recording the service usage event confirmed as the erroneous identification is registered as a watch list and the user cannot be authenticated by comparing the newly input information with a plurality pieces of registered biometric information stored in a storage unit, by comparing the information newly input by the user with the registered biometric information of the watch list; and
a means for demanding, in the case where the newly input information is specified, the consideration of the service of the watch list to the user having input the input information.

5. The user identification system according to claim 2, comprising:
- a means for identifying the information newly input by the user, in the case where at least one piece of the collation log information recording the service usage event confirmed as the erroneous identification is registered as a watch list and the user is not authenticated by comparing the newly input information with a plurality pieces of registered biometric information stored in a storage unit, by comparing the information newly input by the user with the registered biometric information of the watch list;
- a means for causing, in the case where the newly input information is specified, the user having inputted the input information to input the user information; and
- a means for deleting the registered biometric information of the user from the storage unit.

6. The user identification system according to claim 1, comprising:
- a means for deleting, from the object of comparison, the registered biometric information of the user for which the error is identified as recorded with the service usage event confirmed as the erroneous identification;
- a means for comparing again the collation log information recorded in the service usage event with the plurality pieces of the deleted registered biometric information; and
- a means for authenticating the users from the comparison result and distributing the consideration of the service among the users.

7. A user identification method in a system including a settlement terminal which accepts a settlement request from a service user and an identification/settlement server which identifies the service user using biometric information of the service user and executes a settlement process according to the received settlement request, the method comprising:
- by the settlement terminal, obtaining the biometric information of the service user in response to acceptance of the settlement request;
- by the identification/settlement server, storing in a storage unit (1) basic information including a notification address, registered biometric information, a biometric information identification number for identifying the registered biometric information, and a criteria relating to similarity, for each of a plurality of service applicants, and (2) log information in which a record of a service usage event used by a service applicant, a log identification number of the service usage event, and the biometric information identification number of the registered biometric information used for identifying the service usage event, are associated with each other;
- by the identification/settlement server, calculating the similarity by collating the registered biometric information with the obtained biometric information and determining whether the storage unit stores therein the registered biometric information, the similarity of which with the obtained biometric information, satisfies the criteria;
- by the identification/settlement server, notifying, if the storage unit stores the registered biometric information, the similarity of which with the obtained biometric information satisfies the criteria, the notification address associated with the registered biometric information of the service usage event and the log identification number of the service usage event by referring to the storage unit;
- by the identification/settlement server, storing the log information in which the notified log identification number and the biometric information identification number of the registered biometric information which satisfies the criteria are associated with each other; and
- by the identification/settlement server, identifying, when receiving the log identification number as an erroneous identification from the service applicant which receives the notification, the biometric information identification number of the service usage event corresponding to the erroneous identification from the log identification number, and resetting the criteria associated with the registered biometric information identified by the biometric information identification number of the erroneous identification more strictly.

* * * * *